United States Patent
Akamine (10) Patent No.: US 12,382,851 B2
(45) Date of Patent: Aug. 12, 2025

(54) WORK REGION SETTING SYSTEM, WORK REGION SETTING METHOD, AND WORK REGION SETTING PROGRAM

(71) Applicant: Yanmar Holdings Co., Ltd., Osaka (JP)

(72) Inventor: Shiro Akamine, Osaka (JP)

(73) Assignee: Yanmar Holdings Co., Ltd., Osaka (JP)

( * ) Notice: Subject to any disclaimer, the term of this patent is extended or adjusted under 35 U.S.C. 154(b) by 0 days.

(21) Appl. No.: 18/035,282

(22) PCT Filed: Oct. 21, 2021

(86) PCT No.: PCT/JP2021/038859
§ 371 (c)(1),
(2) Date: May 3, 2023

(87) PCT Pub. No.: WO2022/102366
PCT Pub. Date: May 19, 2022

(65) Prior Publication Data
US 2024/0008382 A1    Jan. 11, 2024

(30) Foreign Application Priority Data
Nov. 12, 2020   (JP) ................... 2020-188653

(51) Int. Cl.
*A01B 69/00* (2006.01)
*G05D 1/00* (2006.01)

(52) U.S. Cl.
CPC .......... *A01B 69/004* (2013.01); *G05D 1/021* (2013.01)

(58) Field of Classification Search
None
See application file for complete search history.

(56) References Cited

U.S. PATENT DOCUMENTS

| | | | |
|---|---|---|---|
| 2005/0075785 A1* | 4/2005 | Gray | G05D 1/0274 701/410 |
| 2012/0101725 A1* | 4/2012 | Kondekar | G05D 1/0219 701/445 |

(Continued)

FOREIGN PATENT DOCUMENTS

JP    2020106977 A    7/2020

OTHER PUBLICATIONS

Bosse et al., "Coverage Algorithms for an Under-actuated Car-Like Vehicle in an Uncertain Environment", 2007 IEEE International Conference on Robotics and Automation, Apr. 10-14, 2007, pp. 698-703 (Year: 2007).*

(Continued)

*Primary Examiner* — Tamara L Weber
(74) *Attorney, Agent, or Firm* — Chris Mizumoto (57) ABSTRACT

A position acquisition unit acquires positional information of a work vehicle. A travel trajectory generation unit generates a travel trajectory of the work vehicle on the basis of the positional information acquired by the position acquisition unit. A complement point generation unit generates, as selection target points, a first complement point which is an intersection point between extended lines of two adjacent straight lines connecting the travel trajectory generated by the travel trajectory generation unit, and a second complement point within a region from the travel trajectory to the first complement point. A work region generation unit generates a work region of the work vehicle on the basis of the selection target point selected by a user.

9 Claims, 8 Drawing Sheets

(56) References Cited

U.S. PATENT DOCUMENTS

2015/0142308 A1* 5/2015 Schmidt ............ G01C 21/3664
701/467
2015/0331423 A1 11/2015 Volger et al.
2019/0208695 A1* 7/2019 Graf Plessen ....... A01B 69/008
2021/0084812 A1* 3/2021 Matus .................. A01D 34/008

OTHER PUBLICATIONS

Hameed, "Coverage Path Planning Software for Autonomous Robotic Lawn Mower using Dubins' Curve", 2017 IEEE International Conference on Real-time Computing and Robotics, Jul. 14-18, 2017, pp. 517-522 (Year: 2017).*

* cited by examiner

WORK REGION SETTING SYSTEM, WORK REGION SETTING METHOD, AND WORK REGION SETTING PROGRAM

CROSS-REFERENCE

This application is a US National Stage Application under 35 U.S.C. § 371 of International Application No. PCT/JP2021/038859 filed Oct. 21, 2021, which claims foreign priority of JP2020-188653 filed Nov. 12, 2020 and the disclosures of which are hereby incorporated by reference in their entirety.

TECHNICAL FIELD

This invention relates to a work region setting system, a work region setting method, and a work region setting program for setting a work region of an autonomous work vehicle.

BACKGROUND ART

When setting a travel route for an autonomous work vehicle, a process is performed to register a field to be the work region. Specifically, an operator identifies a shape of the field by driving around the periphery of the field with the work vehicle and identifying corners from a travel trajectory of the work vehicle (see, for example, Patent Literature 1). When the identified field is set as a work region and a travel route is set to travel in the work region, the work vehicle can autonomously travel in the work region following the travel route.

CITATION LIST

Patent Literature

Patent Literature 1: Japanese Patent Laid-open Publication No. 2017-163922

DISCLOSURE OF INVENTION

Problems to be Solved by the Invention

Here, for example, if there is an obstacle such as a slope to enter a field at a corner of the field, the work vehicle must travel and work while avoiding the corner. However, in the conventional technology, the corners of the field have been set based on the travel trajectory, so the work region has been set with the corners overlapping the obstacles. It results in a problem in that the work vehicle traveling in the work region comes into contact with the obstacles.

An object of the present invention is to provide a work region setting system, a work region setting method, and a work region setting program for setting a work region capable of preventing the work vehicle from contacting obstacles.

Means for Solving the Problems

A work region setting system of the present invention includes a position acquisition unit, a trajectory generation unit, a complement point generation unit, and a work region generation unit. The position acquisition unit acquires position information of a work vehicle. The travel trajectory generation unit generates a travel trajectory of the work vehicle based on the position information. The complement point generation unit generates as a selection target point a first complement point that is an intersection point of two extending adjacent straight lines connecting the travel trajectory generated by the travel trajectory generation unit and a second complement point within an area from the travel trajectory to the first complement point. The work region generation unit generates the work region of the work vehicle based on the selection target point selected by the user.

A method of setting a work region of the present invention is a method performing: by one or more processors, acquiring position information of the work vehicle; generating a travel trajectory of the work vehicle based on the position information; generating as a selection target point a first complement point that is an intersection point of two extending adjacent straight lines connecting the travel trajectory and a second complement point within an area from the travel trajectory to the first complement point; and generating a work region of the work vehicle based on the selection target point selected by a user.

A work region setting program of the present invention is a program for causing one or more processors to execute a procedure comprising: acquiring position information of a work vehicle; generating a travel trajectory of the work vehicle based on the position information; generating as a selection target point a first complement point that is an intersection point of two extending adjacent straight lines connecting the travel trajectory and a second complement point within an area from the travel trajectory to the first complement point; and generating a work region of the work vehicle based on the selection target point selected by a user.

Effect of the Invention

The present invention provides a work region setting system, a work region setting method, and a work region setting program for setting a work region capable of preventing the work vehicle from contacting obstacles.

DESCRIPTION OF EMBODIMENTS

The following embodiments are examples that embody the present invention, and are not intended to limit the technical scope of the present invention.

First Embodiment

Figure 1:
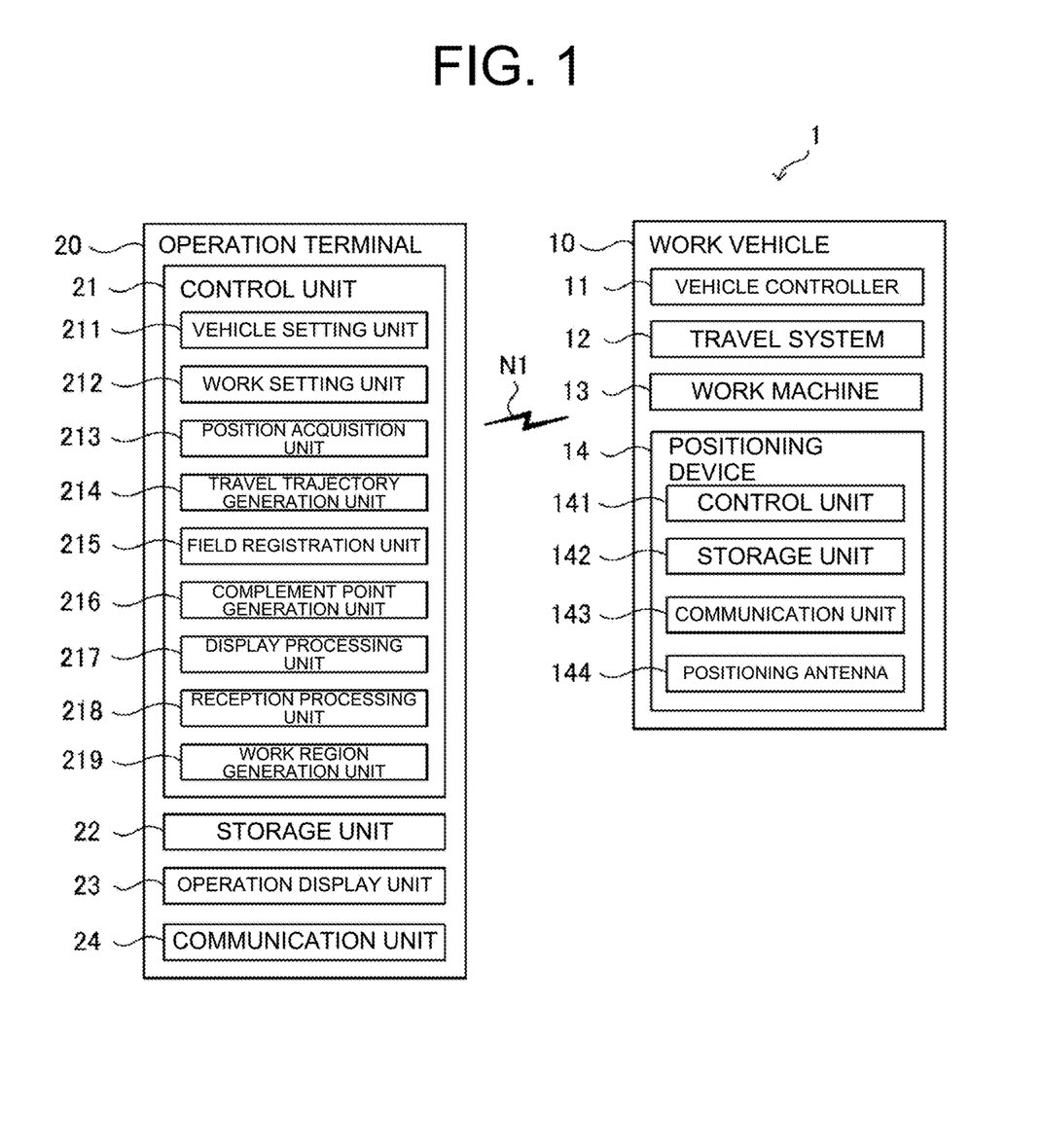
FIG. 1 is a diagram illustrating a configuration of an autonomous travel system according to a first embodiment of the present invention.

As shown in FIG. 1, an autonomous travel system 1 according to a first embodiment of the present invention includes a work vehicle 10 and an operation terminal 20. The work vehicle 10 and the operation terminal 20 can communicate with each other via a communication network N1. For example, the work vehicle 10 and the operation terminal 20 can communicate with each other via a mobile phone line network, a packet line network, or a wireless LAN (the Internet).

The work vehicle of the present invention is a tractor, for example. The work vehicle may be a rice transplanter, combine harvester, construction equipment, etc. The work vehicle 10 is a so-called robot tractor which has a configuration allowing the work vehicle to perform an autonomous travel (automatic travel) along a travel route in a work region R2 of a field F (see FIG. 7). For example, based on positional information about a current position of the work vehicle 10, which is calculated by a positioning device 14, the work vehicle 10 can travel autonomously along the travel route that is generated for the field F in advance. The operation terminal 20 sets the field F, work region R2, travel route, etc. based on operations of an operator (an example of a user of the present invention).

Work Vehicle 10

Figure 2:
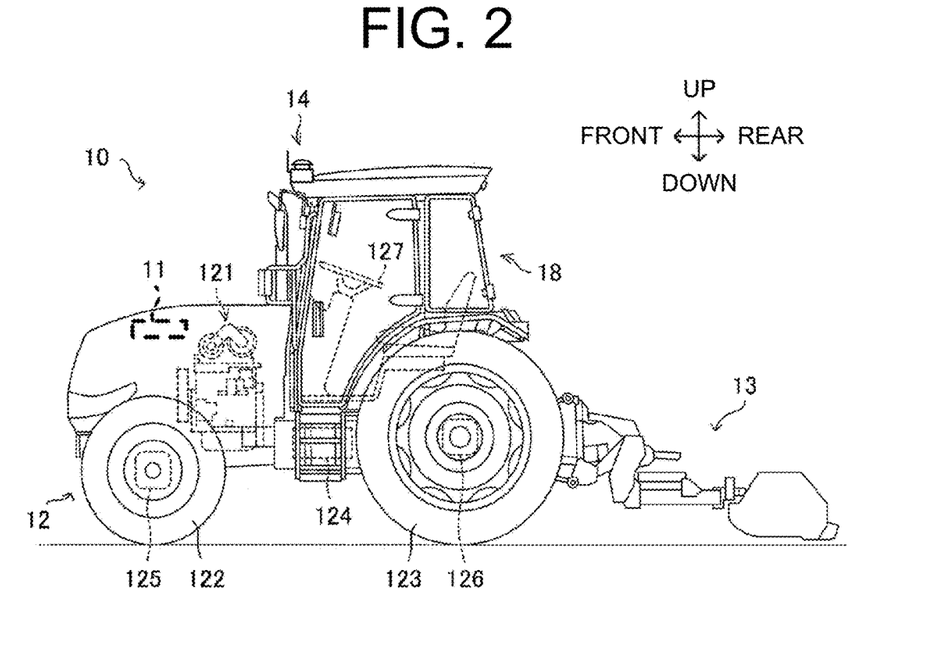
FIG. 2 is an external view illustrating an example of a work vehicle according of the first embodiment of the present invention.

As shown in FIGS. 1 and 2, the work vehicle 10 includes a vehicle controller 11, a travel system 12, a work machine 13, the positioning device 14, and the like. The vehicle controller 11 is electrically connected to the travel system 12, the work machine 13, the positioning device 14, and the like. The vehicle controller 11 and the positioning device 14 can communicate with other devices wirelessly.

The vehicle controller 11 is a computer system that includes one or more processors and a storage memory such as non-volatile memory and RAM. The vehicle controller 11 controls operation of the work vehicle 10 in response to various user's operations on the work vehicle 10. In addition, the vehicle controller 11 performs an autonomous travel process of the work vehicle 10 based on the current position of the work vehicle 10, which is calculated by the positioning device 14 described below, and the travel route which is generated in advance. The travel route is stored in the storage memory. The travel route may be stored in a storage unit 22 of the operation terminal 20.

The travel system 12 is a drive unit for causing the work vehicle 10 to travel. As shown in FIG. 2, the travel system 12 includes an engine 121, a front wheel 122, a rear wheel 123, a transmission 124, a front axle 125, a rear axle 126, a steering wheel 127, and the like. The front wheel 122 and the rear wheel 123 are each provided to right and left sides of the work vehicle 10. Furthermore, the travel system 12 is not limited to be of a wheel type including the front wheel 122 and the rear wheel 123 but may be of a crawler type including a crawler that is provided to the right and left sides of the work vehicle 10.

The engine 121 is a drive source, such as a diesel engine or a gasoline engine, which is driven by using fuel supplied to a fuel tank (not shown). In addition to the engine 121, or instead of the engine 121, the travel system 12 may include an electric motor as the drive source. A generator (not shown) is connected to the engine 121, and electric power is supplied from the generator to electrical components such as the vehicle controller 11, a battery, and the like which are provided in the work vehicle 10. The battery is charged with the electric power which is supplied from the generator. The electrical components such as the vehicle controller 11 and the positioning device 14, which are provided in the work vehicle 10, can be driven by the electric power supplied from the battery even after the engine 121 is stopped.

Drive power of the engine 121 is transmitted to the front wheel 122 through the transmission 124 and the front axle 125 and is transmitted to the rear wheel 123 through the transmission 124 and the rear axle 126. The drive power of the engine 121 is also transmitted to the work machine 13 through a PTO shaft (not shown). In the case where the work vehicle 10 performs the autonomous travel, the travel system 12 performs a travel operation according to an instruction from the vehicle controller 11.

The work machine 13 includes a mower, a cultivator, a plow, a fertilizer, and a sowing machine, for example, and the work machine 13 is detachable to/from the work vehicle 10. Thus, the work vehicle 10 can perform various types of work by using the respective work machine 13. Hereinafter, the work machine 13, which is the mower, is described as an example.

In the work vehicle 10, the work machine 13 may be liftably supported by a lift mechanism (not shown). The vehicle controller 11 can lift the work machine 13 by controlling the lift mechanism. For example, the vehicle controller 11 lowers the work machine 13 when the work vehicle 10 travels forward in a work region R2 of the field F (see FIG. 7), and lifts the work machine 13 when the work vehicle 10 travels backward therein.

A steering wheel 127 is an operation unit that is operated by the operator or the vehicle controller 11. For example, in the travel system 12, an angle of the front wheel 122 is changed by a hydraulic power steering mechanism (not shown) in response to operation of the steering wheel 127 by the vehicle controller 11, so that an advancing direction of the work vehicle 10 can be changed.

In addition to the steering wheel 127, the travel system 12 includes a shift lever, an accelerator, a brake, and the like (all not shown) which are operated by the vehicle controller 11. Then, in the travel system 12, a gear of the transmission 124 is switched to a forward gear, a reverse gear, or the like in response to operation of the shift lever by the vehicle controller 11, and thereby a travel mode of the work vehicle 10 is switched to forward travel, reverse travel, or the like, respectively. In addition, the vehicle controller 11 operates the accelerator to control a speed of the engine 121. Furthermore, the vehicle controller 11 brakes rotation of the front wheels 122 and the rear wheels 123 by operating the brake to use an electromagnetic brake.

The positioning device 14 is a communication device that includes a control unit 141, a storage unit 142, a communication unit 143, a positioning antenna 144, and the like. For example, as shown in FIG. 2, the positioning device 14 is provided on the top of a cabin 18 in which the operator gets. An installation position of the positioning device 14 is not limited to the cabin 18. Furthermore, the control unit 141, the storage unit 142, the communication unit 143, and the positioning antenna 144 of the positioning device 14 may be separately located at different positions in the work vehicle 10. As described above, the battery is connected to the positioning device 14, and the positioning device 14 can be operated even when the engine 121 is stopped. For example, a mobile phone terminal, a smartphone, a tablet terminal, or the like may be used in place of the positioning device 14.

The control unit 141 is a computer system which includes one or more processors and storage memory such as non-volatile memory and RAM. The storage unit 142 is non-volatile memory that stores a program for causing the control unit 141 to execute a positioning process and data such as positioning information, movement information, and the like. For example, the program is non-transitorily recorded in a computer-readable recording medium such as a CD or a DVD, is read by a predetermined reader (not shown), and is stored in the storage unit 142. The program may be downloaded to the positioning device 14 from a server (not shown) via the communication network N1 and stored in the storage unit 142.

The communication unit 143 is a communication interface that connects the positioning device 14 to the communication network N1 in a wired or wireless manner to perform data communication with an external device such as a base station server, via the communication network N1 according to a predetermined communication protocol.

The positioning antenna 144 is an antenna to receive a radio wave (a GNSS signal) emitted from a satellite.

The control unit 141 calculates the position (the current position) of the work vehicle 10 based on the GNSS signal that is received by the positioning antenna 144 from the satellite. For example, in the case where the positioning antenna 144 receives the radio waves (emitted time, locus information, and the like) emitted from the plural satellites when the work vehicle 10 performs the autonomous travel in the field F, the control unit 141 calculates distances between the positioning antenna 144 and each of the satellites and calculates the current position (a latitude and a longitude) of the work vehicle 10 based on the calculated distances. The control unit 141 may perform the positioning by adopting a real-time kinematic positioning method (an RTK-GPS positioning method, hereinafter referred to as an "RTK method") to calculate the current position of the work vehicle 10 by using correction information that corresponds to the base station (a reference station) near the work vehicle 10. In such a way, the work vehicle 10 performs the autonomous travel by using the positioning information acquired by the RTK method.

The travel route on which the work vehicle 10 travels is generated by the operation terminal 20, for example. The work vehicle 10 acquires data on the travel route from the operation terminal 20 to carry out the work (for example, mowing work) by the work machine 13 while performing the autonomous travel along the travel route in the field F.

Operation Terminal 20

As shown in FIG. 1, the operation terminal 20 is an information processor that includes a control unit 21, the storage unit 22, an operation display unit 23, a communication unit 24, and the like. The operation terminal 20 may be a mobile terminal such as the tablet terminal, the smartphone, or the like.

The communication unit 24 is a communication interface that connects the operation terminal 20 to the communication network N1 in a wired or wireless manner to perform data communication with an external device such as one or more work vehicles 10, via the communication network N1 according to a predetermined communication protocol.

The operation display unit 23 is a user interface that includes a display unit, such as a liquid crystal display or an organic EL display which displays various types of information and an operation unit, such as a touch panel, a mouse, or a keyboard which accepts operation. On an operation screen that is displayed in the display unit, the operator can operate the operation unit to perform operations for registering various types of information (work vehicle information, field information, work information, work region information, and the like described below). In addition, the operator can operate the operation unit to issue an autonomous travel instruction to the work vehicle 10. Furthermore, at a position away from the work vehicle 10, the operator can comprehend a travel state of the work vehicle 10, which travels autonomously along the travel route in the field F, from the travel trajectory that is displayed on the operation terminal 20.

The storage unit 22 is a non-volatile storage unit, such as a hard disk drive (HDD) or a solid state drive (SSD), that stores the various types of the information. The storage unit 22 stores control programs such as a work region setting program to cause the control unit 21 to execute a work region setting process (see FIG. 8) described below. For example, the work region setting program is non-transitorily recorded in a computer-readable recording medium such as a CD or a DVD, is read by the reader (not shown) such as a CD drive or a DVD drive provided in the operation terminal 20, and is stored in the storage unit 22. It should be noted that the work region setting program may be downloaded from a server (not shown) via the communication network N1 to the management operation terminal 20 to be stored in the storage unit 22. The storage unit 22 may also store the work information (a mowing amount, a harvest amount, and the like) that is sent from the work vehicle 10.

In addition, a dedicated application for the autonomous travel of the work vehicle 10 is installed in the storage unit 22. The control unit 21 activates the dedicated application, executes a setting process of the various types of the information on the work vehicle 10, a setting process of the field F, a setting process of the work region, and a travel route generation process of the work vehicle 10, and issues the autonomous travel instruction to the work vehicle 10.

Figure 4:
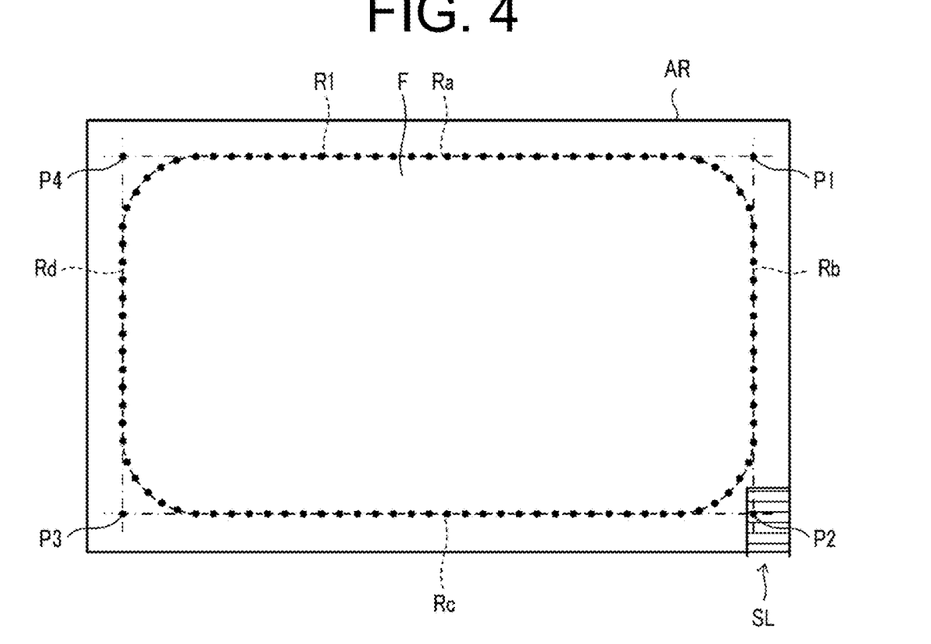
FIG. 4 is a diagram illustrating an example of a first complement point according to the first embodiment of the present invention.

Here, in the conventional art, it was concerned that the work vehicle 10 traveling in the work region comes into contact with obstacles. For example, when registering a field F in the predetermined area AR, the operator drives the work vehicle 10 around a perimeter of the area where the operator desires to register as the field F The control unit 21 acquires position information from the work vehicle 10, generates a travel trajectory R1, and registers the field F based on the travel trajectory R1. For example, as shown in FIG. 4, the control unit 21 generates an intersection point P1 of adjacent extending straight lines Ra and Rb connecting the travel trajectory R1, an intersection point P2 of adjacent extending straight lines Rb and Rc connecting the travel trajectory R1, an intersection point P3 of adjacent extending straight lines Rc and Rd connecting the travel trajectory R1, an intersection point P4 of adjacent extending straight lines Rd and Ra connecting the travel trajectory R1. Each of the abovementioned intersection points is referred to as "the first complement point." The control unit 21 registers the region surrounded by the first complement points P1-P4 as the field F (see FIG. 5). In other words, the first complement points P1-P4 become the corners of the field F. The control unit 21 also sets the region surrounded by the first complement points P1-P4 as the work region R2. After the work region R2 is set, the control unit 21 generates the travel route for the autonomous travel in the work region R2. The work vehicle 10 travels and works in the work region R2 following the generated travel route.

Figure 5:
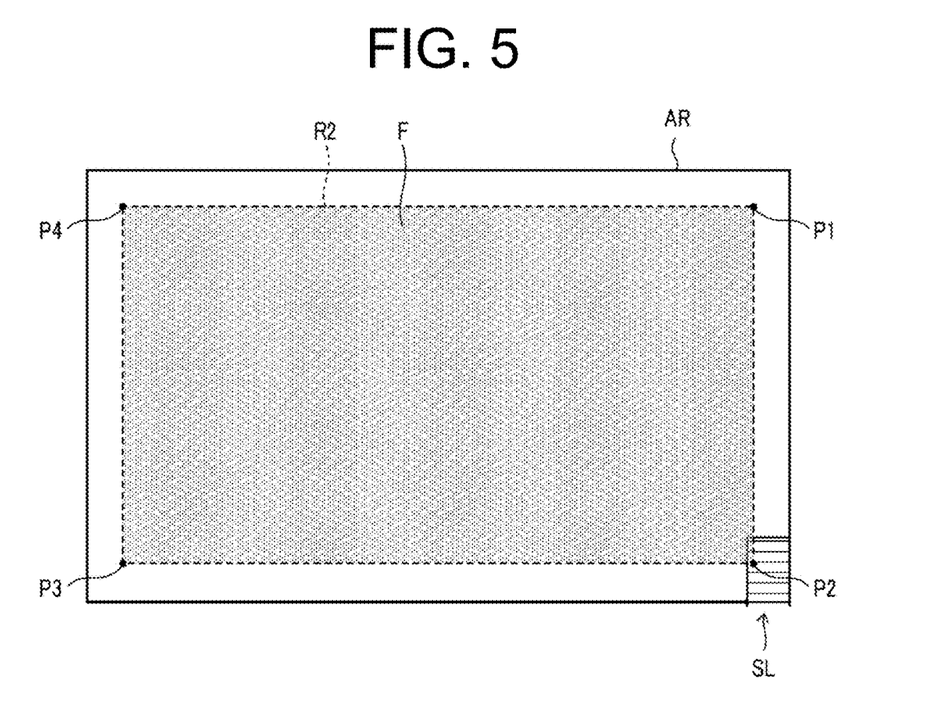
FIG. 5 is a diagram illustrating an example of a field (work region) generated in a conventional system.

Here, if there is an obstacle such as a slope SL in the predetermined area AR and a part of the slope SL overlaps the field F, the work region R2 may be set with the corner of the field F overlapping the obstacle as shown in FIG. 5. In this case, there is a problem in that when the work vehicle 10 travels in the work region R2, it contacts the slope SL.

In contrast, the autonomous travel system 1 according to the first embodiment is configured to generate a work region in which the work vehicle 10 traveling autonomously can avoid contacting obstacles, as described below.

Specifically, as shown in FIG. 1, the control unit 21 of the operation terminal 20 includes various types of processing units, such as a vehicle setting unit 211, a work setting unit 212, a position acquisition unit 213, a travel trajectory generation unit 214, a field registration unit 215, a complement point generation unit 216, a display processing unit 217, a reception processing unit 218, and a work region generation unit 219. The control unit 21 functions as the various types of processing units by causing the CPU to execute the various types of processes according to the work region setting program. Some or all of the processing units may be composed of an electronic circuit. The work region setting program may be a program that causes a plurality of processors to function as the processing units.

The vehicle setting unit 211 sets information about the work vehicle 10 (hereinafter referred to as "work vehicle information"). According to the registration operation on the operation terminal 20 by the operator, the vehicle setting unit 211 sets information on a model of the work vehicle 10, an attachment position of the positioning antenna 144 in the work vehicle 10, a type of the work machine 13, a size and a shape of the work machine 13, a position of the work machine 13 with respect to the work vehicle 10, a vehicle speed and the engine speed of the work vehicle 10 during the work, the vehicle speed and the engine speed of the work vehicle 10 during turning, and the like.

The work setting unit 212 sets information on how to specifically perform the work (hereinafter referred to as the "work information"). The work setting unit 212 is configured to be able to set presence or absence of collaborative work between the work vehicle 10 (unmanned tractor) and a manned work vehicle 10, the number of skips, which is the number of work routes to be skipped when the work vehicle 10 turns in a headland, a width of the headland, a width of non-cultivated land, and the like, as the work information.

The position acquisition unit 213 acquires position information of the work vehicle 10. Specifically, the position acquisition unit 213 acquires the position information of the current position of the work vehicle 10 based on the positioning information measured by the positioning device 14. After the position information is acquired, the position acquisition unit 213 registers it in the storage unit 22. For example, the position acquisition unit 213 acquires the position information of the work vehicle 10 at predetermined sampling intervals when the work vehicle 10 is driven in order to register the field F (see FIG. 3). The black dot shown in FIG. 3 corresponds to each position information. The position acquisition unit 213 is an example of the position acquisition unit of the present invention.

Figure 3:
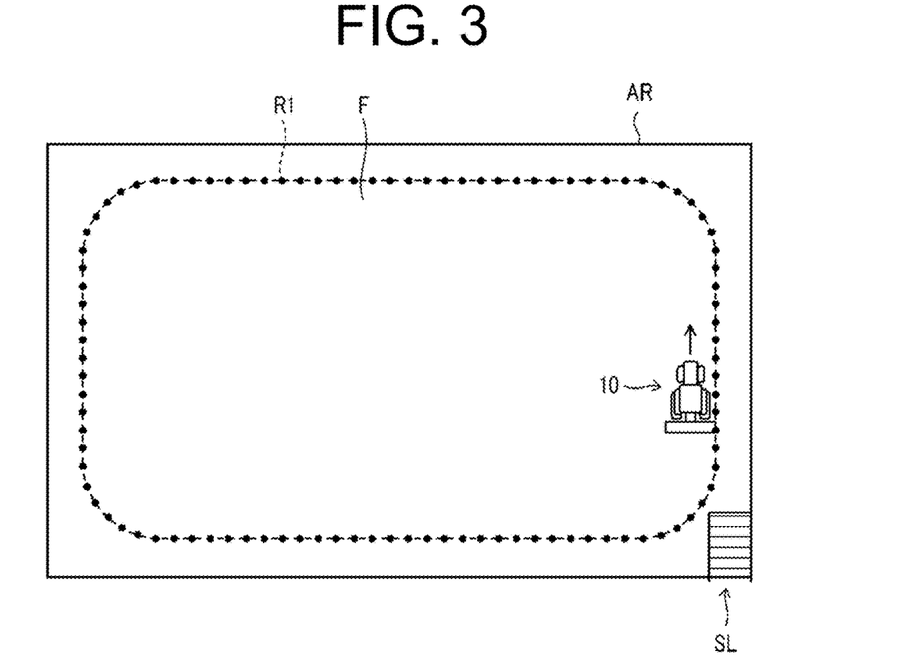
FIG. 3 is a diagram illustrating an example of a travel trajectory of the work vehicle according to the first embodiment of the present invention.

The travel trajectory generation unit 214 generates the travel trajectory R1 of the work vehicle 10 based on the position information acquired by the position acquisition unit 213. For example, as shown in FIG. 3, the travel trajectory generation unit 214 generates the travel trajectory R1 of the periphery in which the work vehicle drives 10 when registering the field F. The travel trajectory R1 is represented by a plurality of points plotted on the map, which correspond to the abovementioned position information, as shown in FIG. 3. The travel trajectory generation unit 214 is an example of a travel trajectory generation unit.

The field registration unit 215 registers the field F Specifically, the field registration unit 215 registers the field F based on the abovementioned position information acquired by the position acquisition unit 213. The field registration unit 215 registers the field F based on the travel trajectory R1 generated by the travel trajectory generation unit 214. Specific examples of field registration are described below.

The complement point generation unit 216 generates the first complement point to set the corner of the field F. Specifically, as shown in FIG. 4, the complement point generation unit 216 generates an intersection point (first complement point P1) of adjacent extending straight lines Ra and Rb connecting the travel trajectory R1, an intersection point (first complement point P2) of adjacent extending straight lines Rb and Rc connecting the travel trajectory R1, an intersection point (first complement point P3) of adjacent extending straight lines Rc and Rd connecting the travel trajectory R1, an intersection point (first complement point P4) of adjacent extending straight lines Rd and Ra connecting the travel trajectory R1. Each of the abovementioned straight lines is an approximate straight line connecting the travel trajectory R1 (plot) of the work vehicle 10 traveling straightforward.

The field registration unit 215 registers the region surrounded by the straight lines connecting the first complement points P1-P4 as field F (see FIG. 5). In such a way, the field registration unit 215 calculates the corners (first complement points) based on the travel trajectory R1 of the work vehicle 10 driven by the operator to register the region surrounded by the corners as the field F. The field registration unit 215 stores information about the field F (field information) in the storage unit 22. The operator can read out information about the field F stored in the storage unit 22 and operate to set a work region R2.

The complement point generation unit 216 further generates a second complement point when setting the work region R2. The second complement point is a point that can be selected by the operator to set the work region R2 (selection target point). Specifically, the complement point generation unit 216 generates a second complement point within an area between the travel trajectory R1 and the first complement point. For example, the complement point generation unit 216 generates one or more second complement points on the extending straight lines within the area between the travel trajectory R1 and the first complement point.

Figure 6:
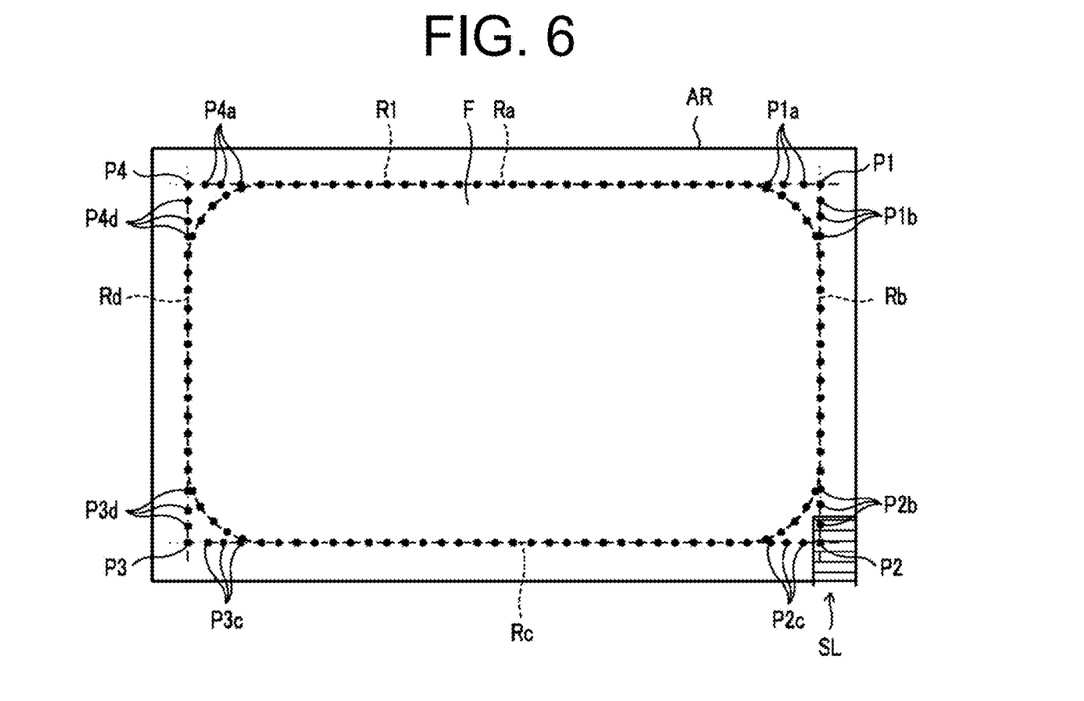
FIG. 6 is a diagram illustrating an example of the first complement point and second complement point according to the first embodiment of the present invention.

For example, as shown in FIG. 6, the complement point generation unit 216 generates one or more second complement points P1a on the extending straight line Ra within the area between the travel trajectory R1 and the first complement point P1 and one or more second complement points P1b on the extending straight line Rb within the area between the travel trajectory R1 and the first complement point P1. Similarly, the complement point generation unit 216 generates one or more second complement points P2b on the extending straight line Rb within the area between the travel trajectory R1 and the first complement point P2 and one or more second complement points P2c on the extending straight line Rc within the area between the travel trajectory R1 and the first complement point P2. Furthermore, the complement point generation unit 216 generates one or more second complement points P3c on the extending straight line Rc within the area between the travel trajectory R1 and the first complement point P3 and one or more second complement points P3d on the extending straight line Rd within the area between the travel trajectory R1 and the first complement point P3. Furthermore, the complement point generation unit 216 generates one or more second complement points P4d on the extending straight line Rd within the area between the travel trajectory R1 and the first complement point P4 and one or more second complement points P4a on the extending straight line Ra within the area between the travel trajectory R1 and the first complement point P4. The complement point generation unit 216 generates the plurality of second complement points on each of the extending straight lines at equal intervals.

As another embodiment, the complement point generation unit 216 may generate one or more second complement points within the area surrounded by a curved turning path of the travel trajectory R1 and two adjacent extending straight lines.

As described above, the complement point generation unit 216 generates as selection target points the first complement points and the second complement points such that the operator can select them when setting the work region R2. The complement point generation unit 216 is an example of a complement point generation unit of the present invention.

The display processing unit 217 displays a setting screen for setting the work region R2. For example, the display processing unit 217 displays the travel trajectory R1, the first complement points P1-P4, and the second complement points P1a, P1b, P2b, P2c, P3c, P3d, P4d, P4a in the abovementioned setting screen. The display processing unit 217 may display the travel trajectory R1, the first complement points, and the second complement points in a different display manner. The travel trajectory R1, the first complement points, and the second complement points are only examples of selection target points of the present invention.

The reception processing unit 218 accepts operation to set the work region R2 by the operator. For example, if a part of the slope SL overlaps the field F (see FIG. 6), the operator can select the first complement point P1, the second complement point P2b, the second complement point P2c, the first complement point P3, and the first complement point P4 so that the work region R2 does not overlap the slope SL. In other words, for the lower right corner of the field F the operator can select the second complement point P2b and the second complement point P2c in place of the first complement point P2.

Figure 7:
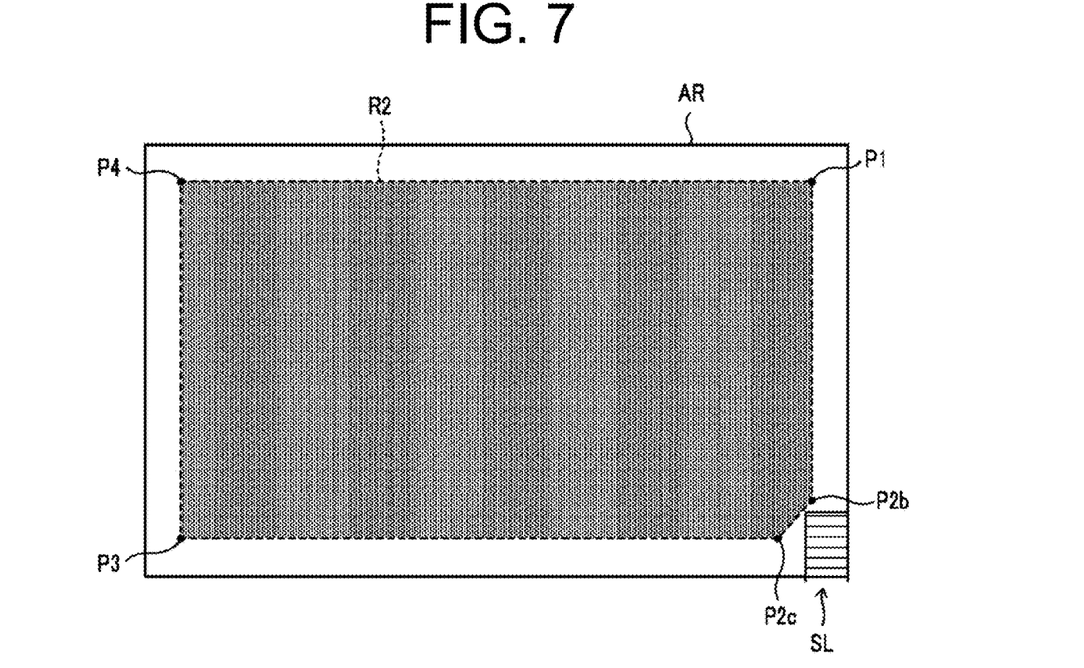
FIG. 7 is a diagram illustrating an example of a work region generated in an autonomous travel system according to the first embodiment of the present invention.

The work region generation unit 219 generates the work region R2 of the work vehicle 10 based on the selection target points selected by the operator. Specifically, the work region generation unit 219 generates as the work region R2 the area surrounded by the first complement points or the area surrounded by the first complement points and the second complement points in the corner. For example, as shown in FIG. 7, if the operator selects the first complement point P1, the second complement point P2b, the second complement point P2c, the first complement point P3, and the first complement point P4, the work region generation unit 219 generates the area surrounded by straight lines connecting these points as the work region R2. In this way, each corner of the work region R2 consists of the first or second complement points. This makes it possible to exclude the slope SL from the work region R2 at the lower right corner of the field F since the work region R2 is partitioned by a diagonal straight line connecting the second complement point P2b and the second complement point P2c.

After the work region generation unit 219 generates the work region R2, the reception processing unit 218 accepts from the operator operations to set the work start position and work end position of the work vehicle 10 in the work region R2. When the reception processing unit 218 receives from the operator operation to specify the work start position and the work end position, the work region generation unit 219 sets the work start position and the work end position in the work region R2. The work region generation unit 219 stores the generated work region R2 information in the storage unit 22. The operator can also read out the work region R2 from the storage unit 22 and edit it. The work region generation unit 219 is an example of a work region generation unit of the present invention.

The control unit 21 further generates a travel route for the autonomous travel of the work vehicle 10 based on the abovementioned setting information. Specifically, the control unit 21 generates a travel route to travel from the work start position to the work end position in the set work region R2. The control unit 21 outputs the generated travel route information to the work vehicle 10. In addition, the control unit 21 can instruct the work vehicle 10 to initiate or stop the autonomous travel or the like by sending a control signal to the work vehicle 10 via the communication unit 24. This allows the work vehicle 10 to travel autonomously.

The work vehicle 10 is configured such that the data on the travel route generated on the operation terminal 20 is transferred to the work vehicle 10, and stored in the storage memory of the vehicle controller 11 as well as the work vehicle 10 can travel autonomously along the travel route while detecting the current position of the work vehicle 10 by the positioning antenna 144. For example, in the case where the current position of the work vehicle 10 is coincident with the work start position, if the operator presses down a work start button on the operation screen to issue the instruction of the "work start", the work vehicle 10 starts the autonomous travel. The vehicle controller 11 causes the work vehicle 10 to travel autonomously from the work start position to the work end position based on the travel route that is acquired from the operation terminal 20. When the work vehicle 10 finishes the work, the vehicle controller 11 may cause the work vehicle 10 to travel autonomously from the work end position to an entrance of the field F.

Here, in the case where the work vehicle 10 travels autonomously, the control unit 21 can receive the state of the work vehicle 10 (position, travel speed, and the like) from the work vehicle 10 and cause the operation display unit 23 to display it.

The operation terminal 20 may be able to access a Web site (an agricultural support site) of an agricultural support service provided by the server (not shown) via the communication network N1. In this case, the operation terminal 20 can function as an operation terminal for the server by executing a browser program by the control unit 21. The server includes the abovementioned processing units in the control unit 21 to execute the processes.

According to the configuration described above, as shown in FIG. 7, it is possible to generate the work region R2 that avoids obstacles (e.g., slope SL). Thus, it is possible to avoid coming into contact with obstacles when the work vehicle 10 travels autonomously in the work region R2.

Figure 8:
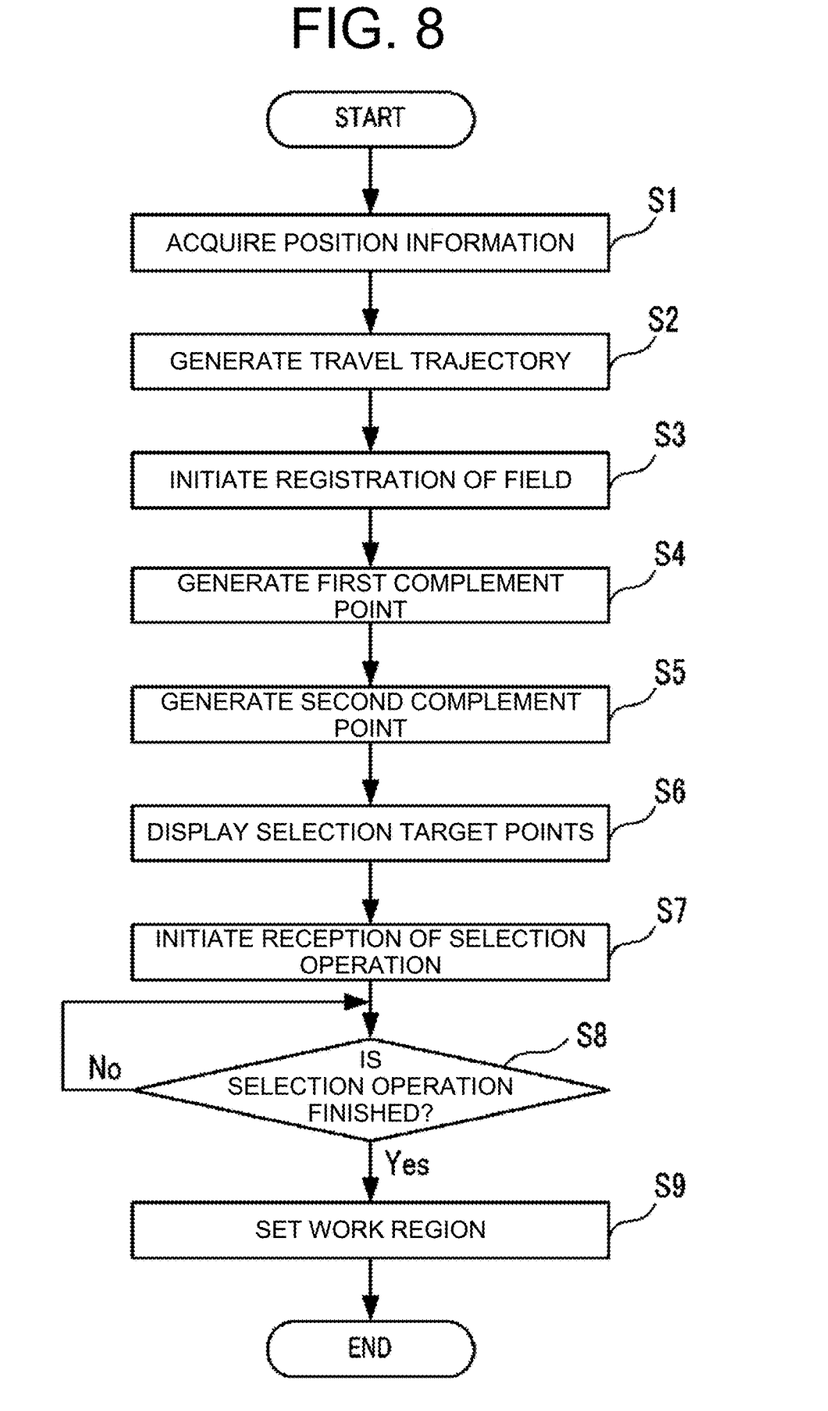
FIG. 8 is a flowchart illustrating an example of a procedure for work region setting process that is executed by the autonomous travel system according to the first embodiment of the present invention.

Work Region Setting Process With reference to FIG. 8, an example of the abovementioned work region setting process, which is executed by the control unit 21 of the operation terminal 20, is described below. For example, the abovementioned work region setting process is initiated by the control unit 21 in response to that the control unit 21 receives from the operator instructions to set the field F and the work region.

It should be noted that the present invention may be understood as an invention of a work region setting method in which the control unit 21 executes a part or all of the work region setting process, or an invention of a work region setting program for causing the control unit 21 to execute a part or all of the work region setting method. In addition, one or more processors may execute the work region setting process.

In step S1, the control unit 21 acquires position information of the current position of the work vehicle 10 driven by the operator when registering the field F. For example, the operator drives the work vehicle 10 along the perimeter of the field target area. The control unit 21 acquires position information of the work vehicle 10 at predetermined intervals based on the positioning information measured by the positioning device 14.

Next, in step S2, the control unit 21 generates a travel trajectory R1 based on the abovementioned position information. For example, as shown in FIG. 3, the control unit 21 generates the travel trajectory R1 of the perimeter along which the work vehicle 10 has traveled.

Next, in step S3, the control unit 21 initiates registration of the field F. Specifically, in step S4, the control unit 21 generates the intersection points (first complement points P1-P4) of the extending adjacent lines connecting the travel trajectory R1, as shown in FIG. 4. The control unit 21 then registers the region surrounded by the first complement points P1-P4 as the field F (see FIG. 5). The control unit 21 stores the registration information of the field F in the storage unit 22.

Next, in step S5, the control unit 21 generates the second complement points to set the work region R2. Specifically, the control unit 21 generates the second complement points within the area between the travel trajectory R1 and the first complement point described above. For example, the complement point generation unit 216 generates the second complement points on the extending line in the area between the travel trajectory R1 and the first complement point. For example, as shown in FIG. 6, the control unit 21 generates the second complement points P1a, P1b, P2b, P2c, P3c, P3d, P4d, and P4a which each correspond to the first complement points P1-P4 respectively corresponding to corners of the field F.

Next, in step S6, the control unit 21 causes the setting screen of the operation terminal 20 to display the selection target points for setting the work region R2. For example, as shown in FIG. 6, the control unit 21 causes the setting screen to display the travel trajectory R1, the first complement points P1-P4, and the second complement points P1a, P1b, P2b, P2c, P3c, P3d, P4d, and P4a. The travel trajectory R1, the first complement points P1-P4, and the second complement points P1a, P1b, P2b, P2c, P3c, P3d, P4d, and P4a are examples of the selection target points of the present invention.

Next, in step S7, the control unit 21 initiates accepting from the operator operations to select the selection target points. In response to that the operator selects two of the points from among the travel trajectory R1, the first complement points P1-P4, and the second complement points P1a, P1b, P2b, P2c, P3c, P3d, P4d and P4a, the control unit 21 causes the setting screen to display a straight line connecting the two points. Furthermore, in response to that the operator selects the third selection target point, the control unit 21 connects the three points with a straight line and causes the setting screen to display the area surrounded by the three points. The control unit 21 generates the area surrounded by the selection target points in response to the operator's selection operation and causes the setting screen to display it. When the operator finishes the selection operation of the abovementioned selection target points (S8: Yes), the process moves to step S9.

Next, in step S9, the control unit 21 sets the work region R2. Specifically, the control unit 21 sets the area surrounded by the selection target points selected by the operator as the work region R2. For example, if the operator selects the first complement point P1, the second complement point P2b, the second complement point P2c, the first complement point P3, and the first complement point P4, as shown in FIG. 7, the control unit 21 sets the area surrounded by straight lines connecting these points as the work region R2. In this way, the control unit 21 sets the work region R2 corresponding to the field F.

As mentioned above, the autonomous travel system 1 according to the present invention acquires position information of the work vehicle 10 and generates a travel trajectory R1 of the work vehicle 10 based on the position information. Furthermore, the autonomous travel system 1 generates as selection target points the first complement points, each of which is the intersection point of two extending adjacent straight lines connecting the generated travel trajectory R1, and the second complement points in the areas between the travel trajectory R1 and the first complement points, and generates the work region R2 of the work vehicle 10 based on the selection target points selected by the operator.

This allows the operator to generate the work region R2 that avoids obstacles if the obstacles exist in the field F, for example. According to the work region R2 generated in this way, the work vehicle 10 can autonomously travel in the work region R2 while avoiding the obstacles.

Second Embodiment

The autonomous travel system 1 of the present invention may have a configuration according to a second embodiment in addition to the configuration according to the first embodiment. In the autonomous travel system 1 according to the second embodiment, description of the same components as the autonomous travel system 1 according to the first embodiment is omitted.

The autonomous travel system 1 according to the second embodiment 2 is provided with a configuration capable of setting a work region R2 of any position and shape in the field F (within the travel trajectory R1). The autonomous travel system 1 can also set multiple work regions R2 within a single field F.

Specifically, the reception processing unit 218 accepts from the operator operations to select any position in the field F in the registered field F. The control unit 21 newly sets the selection target points in the field F. The abovementioned selection target points in the field F are set at predetermined intervals. The operator can select the selection target points by touching the screen with a finger on the operation display unit 23. The work region generation unit 219 generates the work region R2 of the work vehicle 10 based on the selection target points selected by the operator. Specifically, the work region generation unit 219 generates as the work region R2 the area surrounded by a plurality of selection target points within the travel trajectory R1.

Figure 9A:
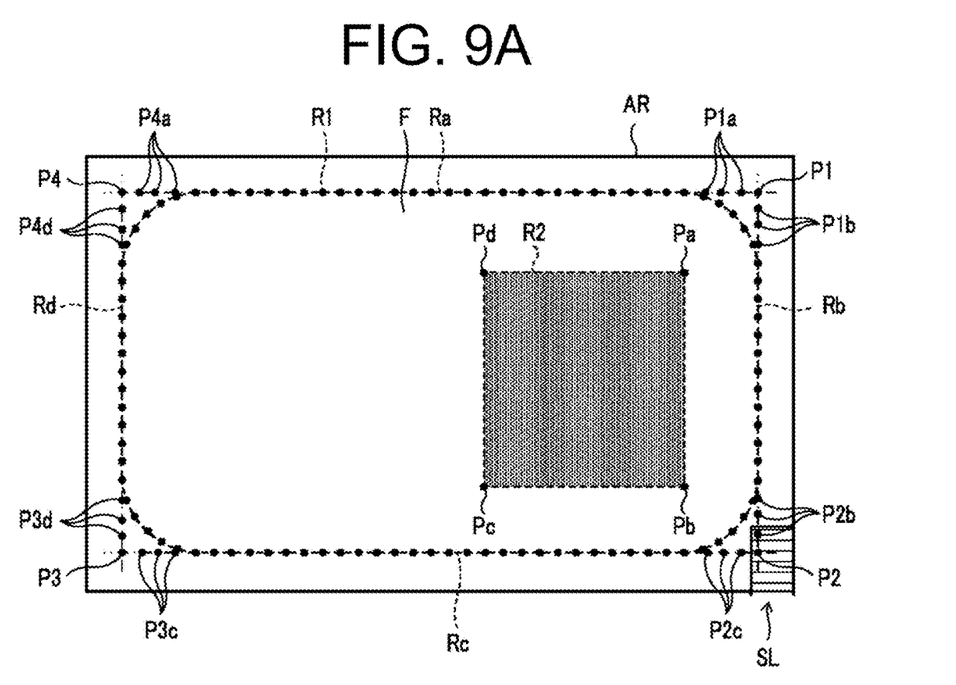
FIG. 9A is a diagram illustrating an example of a work region generated in the autonomous travel system according to a second embodiment of the present invention.

For example, as shown in FIG. 9A, when the operator selects (touches) points Pa, Pb, Pc, and Pd among the selection target points which are newly added in the field F, the work region generation unit 219 generates the area surrounded by straight lines connecting these points as the work region R2. The work region generation unit 219 stores the generated work region R2 information in the storage unit 22.

Figure 9B:
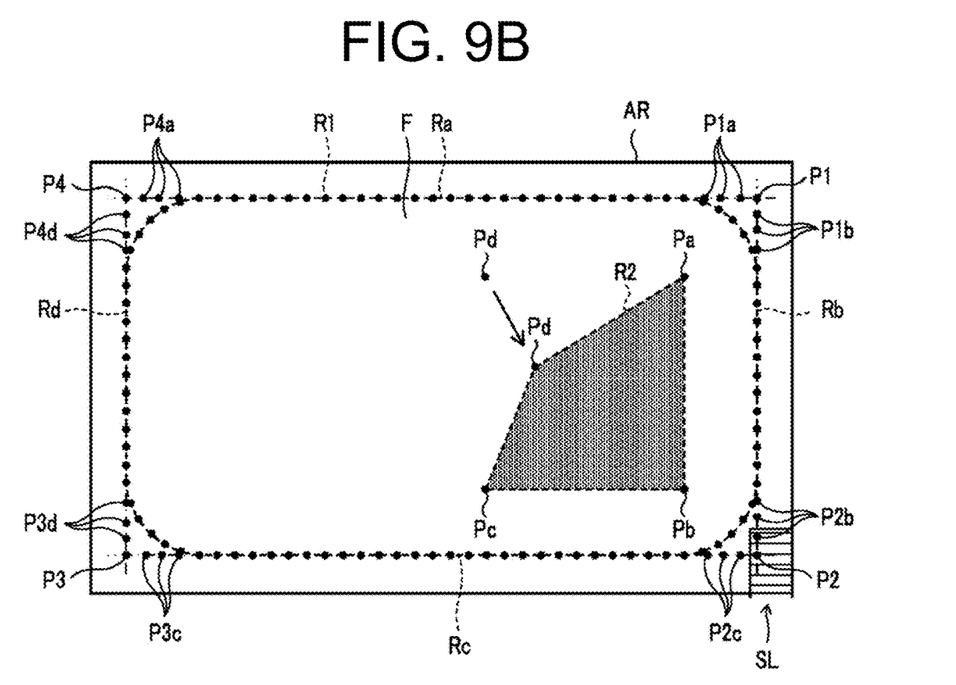
FIG. 9B is a diagram illustrating an example of a work region generated in the autonomous travel system according to the second embodiment of the present invention.

The operator can also read out the work region R2 from the storage unit 22 and edit it. For example, if the operator moves the position of point Pd in the work region R2 shown in FIG. 9A, which is read out from the storage unit 22, the work region generation unit 219 changes a shape of the work region R2 according to the moved position of the point Pd, as shown in FIG. 9B. The operator can perform operation to move the position of the point Pd by touching the screen with a finger on the operation display unit 23 (moving operation).

Figure 10A:
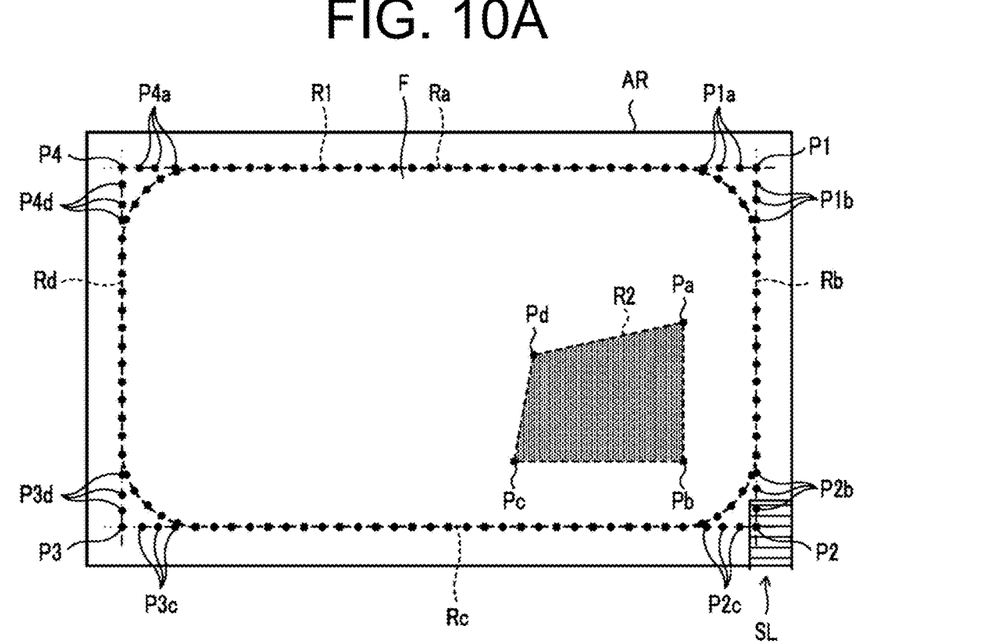
FIG. 10A is a diagram illustrating an example of a work region generated in the autonomous travel system according to the second embodiment of the present invention.
Figure 10B:
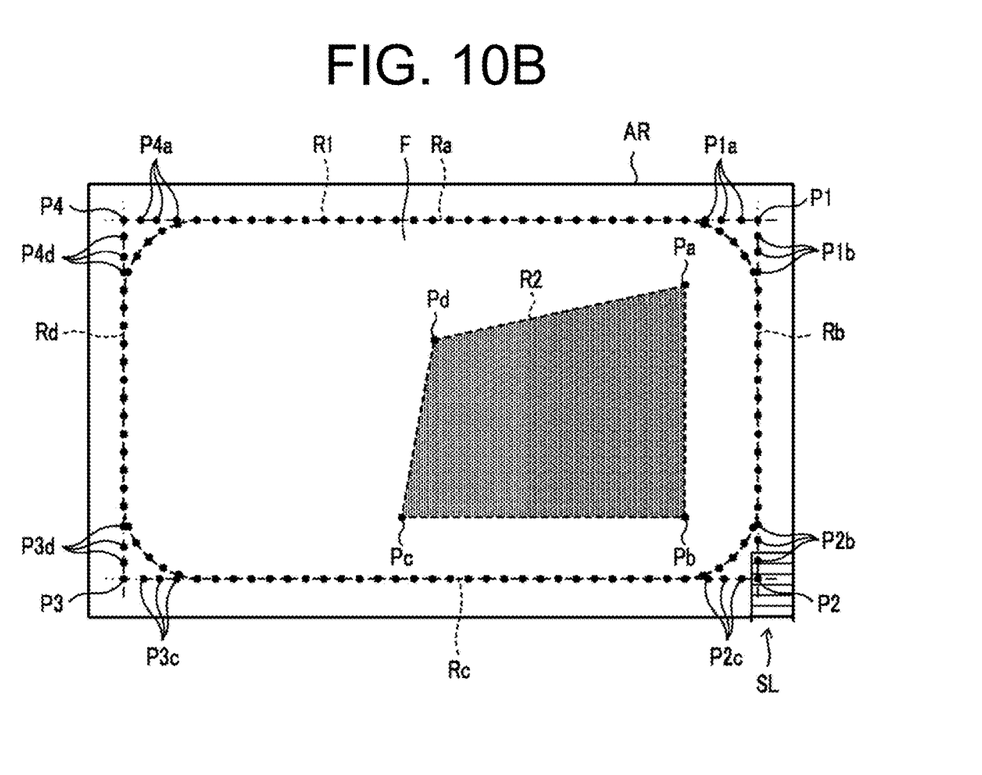
FIG. 10B is a diagram illustrating an example of a work region generated in the autonomous travel system according to the second embodiment of the present invention.

The operator can also enlarge or shrink the work region R2 while maintaining the shape thereof. For example, in the case where the work region R2 shown in FIG. 10A is set, if the operator touches two points in the work region R2 on the screen of the operation display unit 23 to expand a distance between the two points (pinch-out operation), the work region generation unit 219 enlarges the work region R2, as shown in FIG. 10B. Furthermore, if the operator touches two points in the work region R2 on the screen of the operation display unit 23 to narrow the distance between the two points (pinch-in operation), the work region generation unit 219 shrinks the work region R2.

Figure 11A:
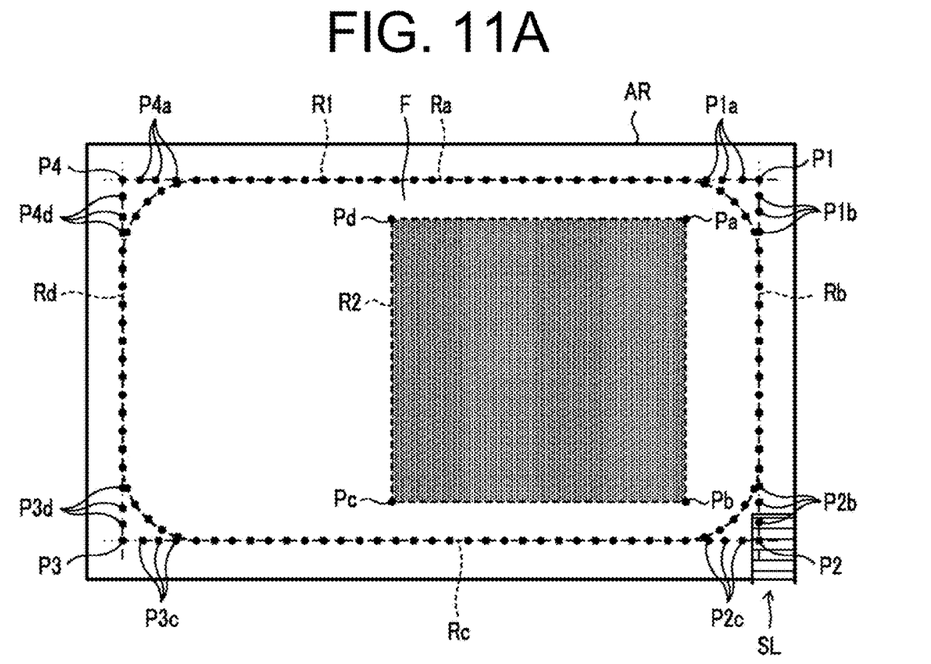
FIG. 11A is a diagram illustrating an example of a work region generated in the autonomous travel system according to the second embodiment of the present invention.
Figure 11B:
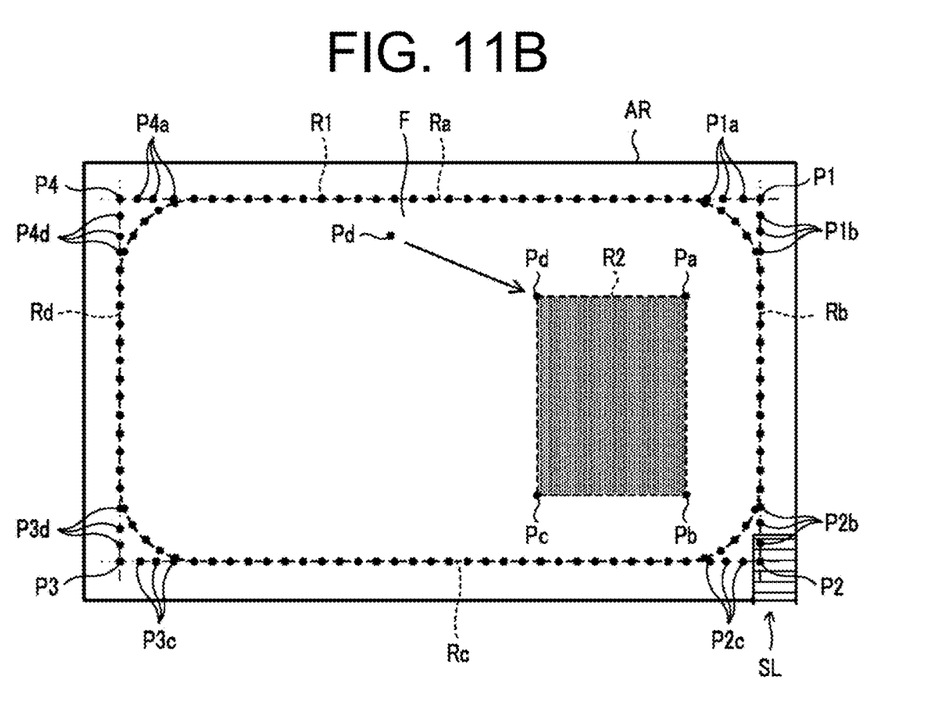
FIG. 11B is a diagram illustrating an example of a work region generated in the autonomous travel system according to the second embodiment of the present invention.

In the case where the rectangular-shaped work region R2 shown in FIG. 11A is set, if the operator touches point Pd and moves it to the lower right side, the work region generation unit 219 changes the shape of the work region R2 while maintaining the angle of each corner at 90 degrees, as shown in FIG. 11B. This makes it easy to generate a rectangular-shaped work region R2 of the desired size.

If the operator touches the generated work region R2 and moves it to the desired position, the work region generation unit 219 moves the work region R2 to that position. In other words, the work region generation unit 219 can operate the work region R2 in the field F to a position according to the operator's operation.

Thus, the work region generation unit 219 may change at least one of the position and shape of the work region R2 based on the operator's predetermined operation on the generated work region R2.

The work region generation unit 219 may also generate multiple work regions R2 in a single field F. The multiple work regions R2 may have the same or different shapes. The operator can set up several different work regions R2 in the single field F depending on the work content, etc.

The work region generation unit 219 may generate as the work region R2 the area surrounded by the selection target points in the field F, the first complement points, and the second complement points. In other words, the work region generation unit 219 may generate as the work region R2 the area surrounded by the selection target points within the travel trajectory R1 and the corner points of the first complement points or the second complement points. For example, if the operator selects on the screen shown in FIG. 11A the point Pd in the field F, the first complement point P1, the second complement point P2b, the second complement point P2c, and the first complement point P3, the work region generation unit 219 generates the area surrounded by straight lines connecting these points as the work region R2.

According to the configuration according to the second embodiment 2, the operator can set the work region R2 at the desired position in the field F by registering the field F once. Therefore, there is no need for the operator to drive the work vehicle 10 again to generate the travel trajectory R1 when generating the work region R2 in the field F. Thus, a setting flexibility of the work region R2 can be improved.

The control unit 21 may set predetermined conditions for the selection target points selectable in the field F. For example, the control unit 21 may selectably set an upper limit to the number of the selection target points. This prevents a complex work region R2 from being generated.

The autonomous travel system 1 according to the second embodiment may have no configuration for generating the second complement point described in the first embodiment. In other words, the work region setting system of the present invention may have only the configuration described in the second embodiment. Furthermore, the autonomous travel system 1 according to the second embodiment may be configured to generate the second complement points described in the first embodiment only when the obstacles exist in the corners and the like of the field F For example, the autonomous travel system 1 according to the second embodiment determines whether or not a corner of the set field F overlaps the obstacle, generates the second complement point when the corner of the field F overlaps the obstacle, and generates the work region R2 of the work vehicle 10 by accepting from the user operation to select the second complement point.

The invention claimed is:

1. A processor-implemented method of setting a work region and initiating performance of work by a work vehicle capable of autonomous navigation, the method comprising:
   acquiring position information of the work vehicle;
   generating a travel trajectory of the work vehicle based on the position information;
   generating as a selection target point a first complement point that is an intersection point of two extending adjacent straight lines connecting the travel trajectory and a second complement point within an area from the travel trajectory to the first complement point; and
   generating a work region of the work vehicle based on the selection target point selected by a user; and
   initiating performance of work by the work vehicle in the generated work region.

2. The method of setting a work region according to claim 1, wherein the second complement point is generated on any of the extending lines within the area from the travel trajectory to the first complement point.

3. The method of setting a work region according to claim 2, wherein a plurality of second complement points, included in the second complement point, are generated on any of the extending lines at equal intervals within the area from the travel trajectory to the first complement point.

4. The method of setting a work region according to claim 1, wherein an area surrounded by a corner of the first complement point or the second complement point is generated as the work region.

5. The method of setting a work region according to claim 1, wherein the selection target point is further set within an area surrounded by the travel trajectory, and
an area surrounded by a plurality of selection target points within the travel trajectory is generated as the work region.

6. The method of setting a work region according to claim 1, wherein the selection target point is further set within an area surrounded by the travel trajectory, and
an area surrounded by the selection target point within the travel trajectory and a corner of the first complement point or the second complement point is generated as the work region.

7. The method of setting a work region according to claim 1, wherein at least one of a position and shape of the work region is changed based on a predetermined operation by the user on the generated work region.

8. A work region setting and work performance system for a work-vehicle capable of autonomous navigation, the system comprising:
a position acquisition unit to acquire position information of a work vehicle;
a travel trajectory generation unit to generate a travel trajectory of the work vehicle based on the position information acquired by the position acquisition unit;
a complement point generation unit to generate as a selection target point a first complement point that is an intersection point of two extending adjacent straight lines connecting the travel trajectory generated by the travel trajectory generation unit and a second complement point within an area from the travel trajectory to the first complement point;
a work region generation unit to generate a work region of the work vehicle based on the selection target point selected by a user; and
a control unit to initiate performance of work by the work vehicle in the generated work region.

9. A non-transitory computer-readable medium comprising instructions to configure a processor to perform a work region setting and work initiating method for a work-vehicle capable of autonomous navigation, the method comprising:
acquiring position information of a work vehicle;
generating a travel trajectory of the work vehicle based on the position information;
generating as a selection target point a first complement point that is an intersection point of two extending adjacent straight lines connecting the travel trajectory and a second complement point within an area from the travel trajectory to the first complement point;
generating a work region of the work vehicle based on the selection target point selected by a user; and
initiating performance of work by the work vehicle in the generated work region.

* * * * *